United States Patent
An et al.

(10) Patent No.: US 6,408,245 B1
(45) Date of Patent: Jun. 18, 2002

(54) FILTERING MECHANIZATION METHOD OF INTEGRATING GLOBAL POSITIONING SYSTEM RECEIVER WITH INERTIAL MEASUREMENT UNIT

(75) Inventors: Dong An; Ching-Fang Lin, both of Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/767,285

(22) Filed: Jan. 22, 2001

Related U.S. Application Data

(60) Provisional application No. 60/223,097, filed on Aug. 3, 2000.

(51) Int. Cl.[7] .................................................. G06G 7/78
(52) U.S. Cl. .................. 701/216; 701/214; 340/357.01; 340/450
(58) Field of Search ............................. 701/216, 214, 701/213, 207; 342/357.01, 450, 451, 357.06, 357.12, 357, 14, 357.05, 357.02

(56) References Cited

U.S. PATENT DOCUMENTS

| | | | | |
|---|---|---|---|---|
| 5,672,872 A | * | 9/1997 | Wu et al. .................. 250/330 |
| 6,205,400 B1 | * | 3/2001 | Lin ............................. 701/214 |
| 6,243,657 B1 | * | 6/2001 | Tuck et al. .................. 702/150 |
| 6,246,960 B1 | * | 6/2001 | Lin ............................. 701/214 |
| 6,278,945 B1 | * | 8/2001 | Lin ............................. 701/216 |
| 6,292,750 B1 | * | 9/2001 | Lin ............................. 701/214 |
| 6,311,129 B1 | * | 10/2001 | Lin ............................. 701/214 |

* cited by examiner

*Primary Examiner*—William A. Cuchlinski, Jr.
*Assistant Examiner*—Olga Hernandez
(74) *Attorney, Agent, or Firm*—Raymond Y. Chan; David and Raymond Patent Group

(57) ABSTRACT

A filtering mechanization method is provided for integrating a Global positioning System receiver with an Inertial Measurement Unit to produce highly accurate and highly reliable mixed GPS/IMU position, velocity, and attitude information of a carrier. The GPS filtered position and velocity data are first individually used as measurements of the two local filters to produce estimates of two sets of the local state vector. Then, the estimates of the two sets of local state vectors are mixed by a master filter device to produce global optimal estimates of master state vector including INS (Inertial Navigation System) navigation parameter errors, inertial sensor errors, and GPS correlated position and velocity errors. The estimates of the two sets of local state vector and master state vector are analyzed by a GPS failure detection/isolation logic module to prevent the mixed GPS/IMU position, velocity, and attitude information from becoming contaminated by undetected GPS failures.

24 Claims, 5 Drawing Sheets

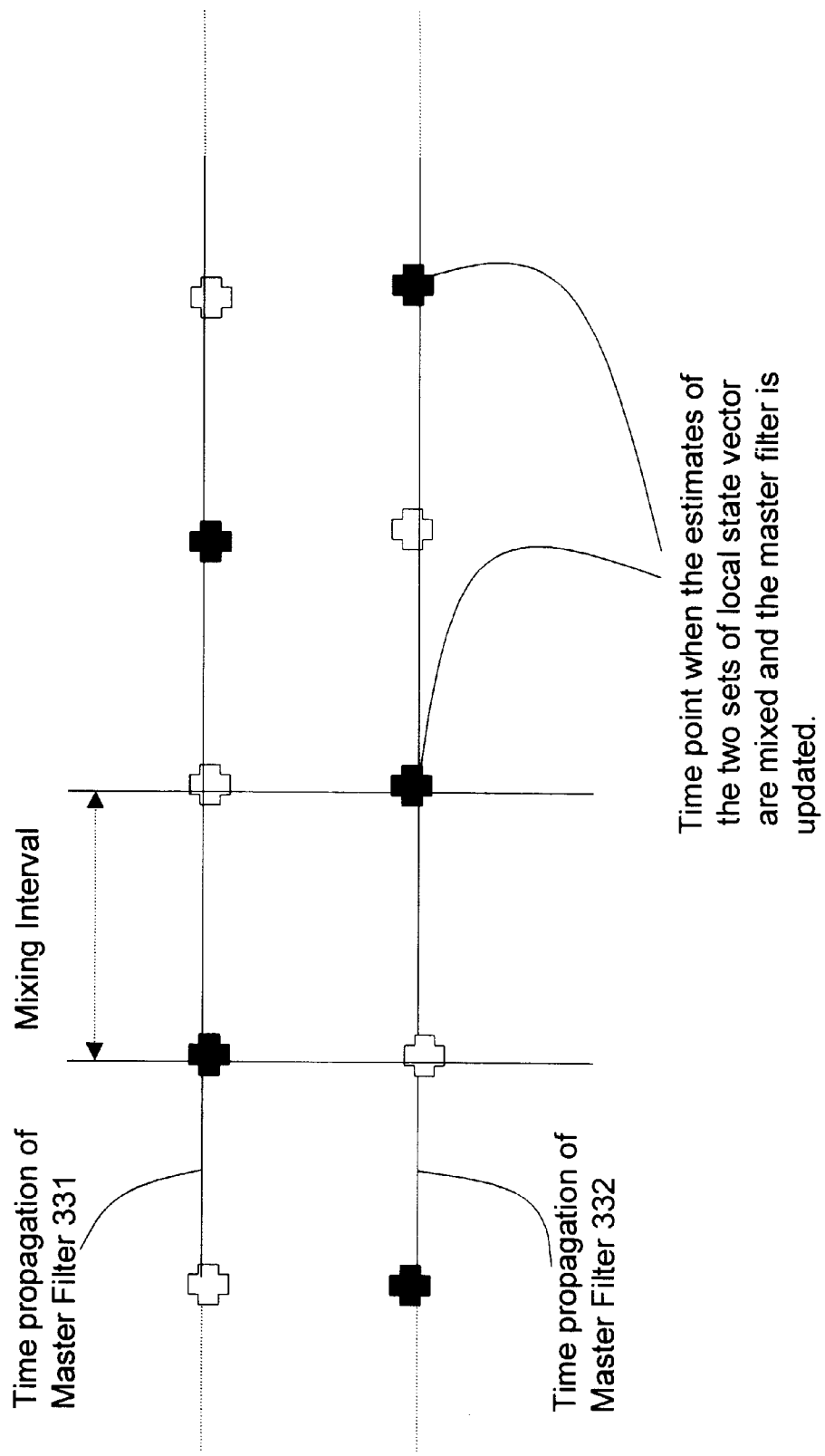

FILTERING MECHANIZATION METHOD OF INTEGRATING GLOBAL POSITIONING SYSTEM RECEIVER WITH INERTIAL MEASUREMENT UNIT

CROSS REFERENCE OF RELATED APPLICATION

This is a regular application of a provisional application having an application No. of 60/223,097 and a filing date of Aug. 3, 2000.

BACKGROUND OF THE PRESENT INVENTION

1. Field of the Present Invention

The present invention relates to a filtering mechanization method, and more particularly to a filtering mechanization method for integration of a Global Positioning System (GPS) receiver with an Inertial Measurement Unit (IMU) to produce highly accurate, highly reliable, and mixed GPS/IMU position, velocity, and attitude measurements of a carrier at affordable cost under high dynamic environments, heavy noise environments, and long-term (long-period) operation.

2. Description of Related Arts

The major function of a navigation system is designed to produce continuous position, velocity, and attitude measurements of a carrier, such as a vehicle, under dynamic environments. The attitude measurements usually include pitch, roll, and heading angle of the carrier.

In the past decade, a low cost inertial navigation system (INS) and GPS (Global Positioning System) receiver were commonly developed to determine the positioning measurements of a vehicle at affordable cost, such as position, velocity, etc.

An INS relies on three orthogonally mounted inertial angular rate sensors and three orthogonally mounted acceleration sensors to produce three-axis angular rate and acceleration measurements. Based on the carrier acceleration and angular rate measurements, the position, velocity, and attitude measurements of a carrier are obtained by numerically solving Newton's equations of motion. The three orthogonally mounted inertial angular rate sensors and three orthogonally mounted acceleration sensors with additional supporting mechanical structures and electronic devices are conventionally called an Inertial Measurement Unit (IMU). The conventional IMUs may be catalogued into Platform IMU and Strapdown IMU.

In the platform IMU, angular rate sensors and acceleration sensors are installed on a stabilized platform. Attitude measurements can be directly picked off from the platform structure. But attitude rate measurements cannot be directly obtained from the platform. Moreover, highly accurate feedback control loops must be designed to implement the platform IMU.

Compared with the platform IMU, in a strapdown IMU, the angular rate sensors and acceleration producers are directly strapped down to the carrier and move with the carrier. The output signals of the angular rate sensors and acceleration sensors are expressed in the carrier body frame. The attitude and attitude rate measurements can be obtained by means of a series of computations.

The INS, which uses a platform IMU, in general, is catalogued as a gimbaled inertial navigation system. The INS, which uses a strapdown IMU, in general, is catalogued as a strapdown inertial navigation system. In a gimbaled inertial navigation system, the angular rate sensors and acceleration sensors are mounted on a gimbaled platform to isolate the sensors from the rotations of the carrier so that the measurements and navigation calculations can be performed in a stabilized navigation coordinates frame. Generally, the motion of the carrier can be expressed in several navigation frames of reference, such as earth centered inertial (ECI), earth-centered earth-fixed (ECEF), and North-East-Down (NED), etc. In a strapdown inertial navigation system, the inertial sensors are rigidly mounted to the carrier body frame. In order to perform the navigation computation in the stabilized navigation frame, a coordinate frame transformation matrix is used and updated to transform the acceleration measurements from the body frame to the navigation frame.

In general, the navigation solution from the gimbaled inertial navigation system is more accurate than the one from the strapdown inertial navigation system. But, a gimbaled inertial navigation system is more complex and expensive than a strapdown inertial navigation system. The strapdown inertial navigation systems become the predominant mechanization due to their low cost and reliability.

An inertial navigation system provides the position, velocity, and attitude information of a carrier through a dead reckoning method. Inertial navigation systems, in principle, perform a self-contained operation and output continuous position, velocity, and attitude data of the carrier after initializing the starting position and initiating an alignment procedure.

In addition to the self-contained operation, other advantages of an inertial navigation system include the full navigation solution and wide bandwidth.

However, an inertial navigation system is expensive and is degraded with drift in output (position, velocity, and attitude) over an extended period of time. It means that the position and velocity errors increase with time. This error propagation characteristic is primarily caused by errors, such as, gyro drifts, accelerometer bias, misalignment, gravity disturbance, initial position and velocity errors, and scale factor errors.

Generally, the ways of improving the accuracy of inertial navigation systems include employing highly accurate inertial sensors and aiding the inertial navigation system using an external sensor. However, highly accurate inertial sensors are very expensive with big size and heavy weight.

A GPS receiver is a very ideal external source to aid an inertial navigation system. The GPS is a satellite-based, worldwide, all-weather radio positioning and timing system. The GPS system is originally designed to provide precise position, velocity, and timing information on a global common grid system to an unlimited number of adequately equipped users.

GPS receivers are designed for a user to exploit the advantages of the Global Positioning System. A conventional, single antenna GPS receiver supplies worldwide, highly accurate three dimensional position, velocity, and timing information, but not attitude information, by processing the so-called pseudo range and delta range measurements output from the code tracking loops and the carrier tracking loops in the GPS receiver, respectively. In a benign radio environment, the GPS signal propagation errors and GPS satellite errors, including the Selective Availability, serve as the bounds for positioning errors. However, the GPS signals may be intentionally or unintentionally jammed or spoofed, and the GPS receiver antenna may be obscured during carrier attitude maneuvering, and the performance degrades when the signal-to-noise ratio of the GPS signal is low and the carrier is undergoing highly dynamic maneuvers.

As both the cost and size of high performance GPS receivers are reduced in the past decade, a multiple-antenna GPS receiver was developed to provide both position and attitude solutions of a vehicle, using interferometric techniques. In principle, the attitude determination technology utilizes measurements of GPS carrier phase differences on the multiple-antenna to obtain highly accurate relative position measurements. Then, the relative position measurements are converted to the attitude solution. The advantages of this approach are long-term stability of the attitude solution and relatively low cost. However, this GPS position and attitude determination system still retains the characterization of low bandwidth which is susceptible to shading and jamming, requires at least 3 antennas configurations for a three-axis attitude solution, and requires antenna separation enough for high attitude resolution.

Because of the inherent drawbacks of a stand-alone inertial navigation system and a stand-alone GPS receiver, a stand-alone inertial navigation system or a stand-alone GPS receiver can not meet mission requirements under some constraints, such as low cost, long-term high accuracy, highly reliable, continuous high rate output, etc.

The mutual complementary characteristics of the stand-alone GPS receiver and the stand-alone inertial navigation system suggest that, in many applications, an integrated GPS/IMU system, combining the best positive properties of both systems, will provide superior accurate continuous navigation capability. This navigation capability is unattainable in either one of the two systems standing alone.

The potential benefits offered by an integrated GPS/IMU system are outlined as follows:

(1) The aiding of the GPS receiver signal-tracking loop process with inertial data allows the effective bandwidth of the loops to be reduced, resulting in an improved tracking signal in noisy and dynamic environments.

(2) An inertial navigation system not only provides navigation information when the GPS signal is lost temporarily, but also reduces the search time required to reacquire GPS signals.

(3) Inertial navigation parameter errors and inertial sensor errors can be calibrated while the GPS signal is available, so that the inertial navigation system can provide more accurate pure inertial position information after the GPS signal is lost.

(4) The GPS enables and provides on-the-fly alignment of an inertial navigation system by means of maneuvering, eliminating the static self-alignment pre-mission requirements of the stand-alone inertial navigation system.

Conventionally, a standard Kalman filtering mechanization, which uses centralized processing mechanization, is used to integrate the navigation information from a GPS receiver with that from an INS. However, the conventional method often suffers from some potential problems, such as correlated noise of the GPS receiver output, unpredicted big transient errors of the GPS velocity, level changes of the GPS receiver output errors due to change of the GPS satellite in view, and other undetected GPS failures.

Moreover, for versatile commercial applications, a low cost, low accuracy IMU is integrated with a GPS chipset. Thus, the long-term position and velocity output of the integrated GPS/IMU system heavily rely on the update of the GPS position and velocity. Therefore, it is very important that the integration process automatically exclude GPS false solutions, so that the integrated GPS/IMU system can exploit the GPS positive features, but remove the GPS negative features. The present invention is disclosed to address these problems.

SUMMARY OF THE PRESENT INVENTION

A main objective of the present invention is to provide a filtering mechanization method of integrating global positioning system receiver with inertial measurement unit, wherein measurements from a GPS (Global Positioning System) receiver and an IMU (Inertial Measurement Unit) are optimally processed to achieve highly accurate and reliable mixed GPS/IMU position, velocity, and attitude information of a carrier under high dynamic, heavy jamming, and long-term operation environments. The present invention features greater flexibility to incorporate GPS failure detection/isolation requirements of the integrated GPS/IMU systems.

Another objective of the present invention is to provide a filtering mechanization method of integrating global positioning system receiver with inertial measurement unit, wherein the position and velocity data from the GPS receiver are independently filtered first in parallel with the output from the inertial navigation processing to obtain two sets of local state vector estimates, including INS navigation parameter errors and inertial sensor errors, and then the two sets of local state vector estimates are mixed to obtain one set of global state vector estimate, including the INS navigation parameter errors and inertial sensor errors, with maximal fault toleration.

Another objective of the present invention is to provide a filtering mechanization method of integrating global positioning system receiver with inertial measurement unit, wherein the local and master filtering mechanization with flexible different update rates is applied to the integration of the GPS receiver with an IMU to overcome the problem of the correlated errors of the position and velocity output from the GPS Kalman filter in conventional GPS/IMU integration approaches.

Another objective of the present invention is to provide a filtering mechanization method of integrating global positioning system receiver with inertial measurement unit, wherein the local and master filter can be incorporated to minimize the response transients when the GPS satellite constellation in view change occurs.

Another objective of the present invention is to provide a filtering mechanization method of integrating global positioning system receiver with inertial measurement unit, wherein the local and master filters can be incorporated to autonomously exclude big unpredicted GPS velocity jumps, such as the transients order of a few meters per second without any other indication.

Another objective of the present invention is to provide a filtering mechanization method of integrating global positioning system receiver with inertial measurement unit, wherein the local and master filters with a failure detection/isolation logic can detect and isolate GPS failures, especially GPS soft failures. The GPS soft failure means that failure is slowly accumulated, which are very tough to detect traditionally.

In order to accomplish the above objectives, the present invention provides a filtering mechanization method for integrating a GPS receiver carried by a carrier with an IMU carried by the carrier for producing a GPS/IMU mixed positioning data of the carrier, which comprises the steps of:

(a) receiving angular rate and acceleration measurements of the carrier from the IMU to a navigation equations processor to produce INS position, velocity, and attitude data of the carrier;

(b) sending INS velocity data from the navigation equations processor and GPS velocity data from a GPS receiver into the first local filter;

(c) producing the first local state vector estimate and the first local error covariance matrix by the first local filter;

(d) sending GPS position data of the GPS receiver and INS position data from the navigation equations processor into the second local filter;

(e) producing the second local state vector estimate and the second local error covariance matrix by the second local filter;

(f) receiving the first local state vector estimate and first local error covariance matrix and the second local state vector estimate and second local error covariance matrix by a master filter to mix the first local filter's state vector estimate and the second filter's state vector estimate to form optimal estimates of the global state vector and global error covariance matrix, including INS parameter errors, inertial sensor errors, and GPS correlated position and velocity error estimates, as output of the INS filter; and (g) compensating the INS position, velocity, and attitude data output of the navigation equations processor using the optimal estimates of the INS parameter errors of the global state vector by an error remover to form the mixed GPS/IMU position, velocity, and attitude data output.

BRIEF DESCRIPTION OF THE DRAWINGS

FIG. 5 is a block diagram illustrating the time propagation and updating of the dual master filters of the master filter device according to the above preferred embodiment of the present invention.

DETAILED DESCRIPTION OF THE PREFERRED EMBODIMENT

Figure 1:
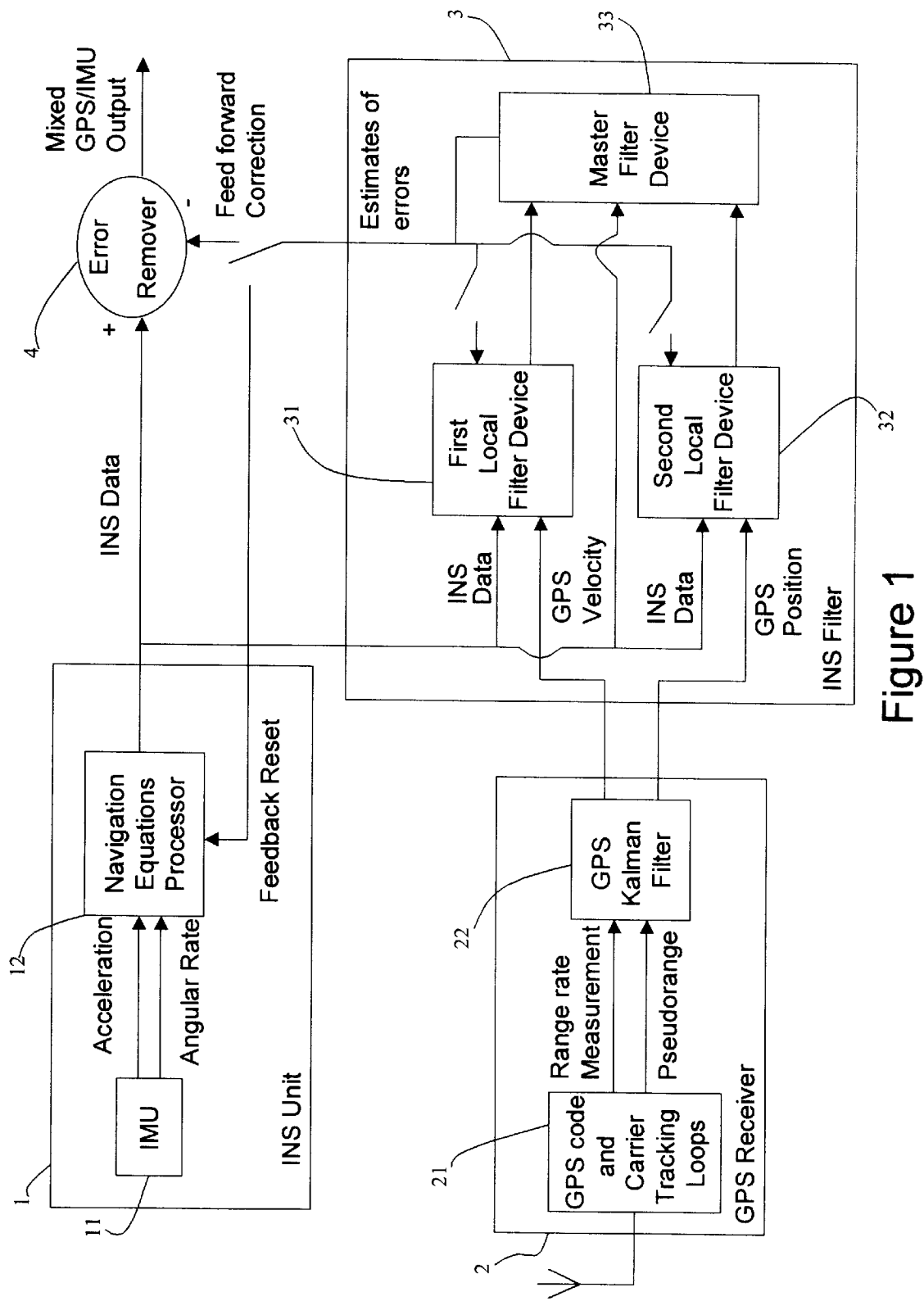
FIG. 1 is a block diagram illustrating the filtering mechanization according to a preferred embodiment of the present invention.

Referring to FIG. 1, a filtering mechanization method of integrating global positioning system receiver with inertial measurement unit is illustrated, wherein the method is to mixed GPS (Global Positioning System) measurements and IMU (Inertial Measurement Unit) measurements of a carrier to achieve long-term, highly accurate and reliable mixed GPS/IMU position, velocity, and attitude information of a carrier.

The GPS receiver concept of operation is briefly summarized as follows:

(1) Tracking the GPS signals from four GPS satellites in view to make the raw GPS pseudorange and delta range measurements of the four GPS satellites by means of the GPS code and carrier tracking loops, wherein the raw GPS pseudorange measurement of a GPS satellite is the sum of the real range from the GPS receiver to the GPS satellite and various errors, and the raw delta range measurements of a GPS satellite is proportional to the Doppler shift on the carrier frequency of the GPS signal from the GPS satellite with various errors; and (2) Figuring out the GPS position solution using the raw GPS pseudorange delta range measurements based upon the triangulation principle, and figuring out the GPS velocity solution using the raw GPS delta range measurements.

Most current GPS receivers commonly have an extended Kalman filter, which is called a GPS Kalman filter, to process the linearized measurements of the raw pseudorange and delta-range measurements obtained from the code and carrier tracking loops residing in the GPS receivers to provide a position, velocity, and time solution. Other methods to convert the raw GPS pseudorange and delta range measurements into the position and velocity of the carrier include single-point solution.

The GPS/IMU integration can provide clear advantages, including ubiquitous coverage, indoor operation, and non-line-of-sight situations, combining the long-term accuracy of GPS and the short-term stability of an autonomous INS.

In the conventional cascaded configuration of a GPS/IMU integration, the GPS derived position and velocity are used as measurements of a Kalman filter, which is called the INS Kalman filter (IKF) to produce the optimal estimates of INS parameter errors and inertial sensor errors, which are fed back or fed forward to compensate the INS position, velocity, and attitude solution. However, this method is plagued by the following potential problems.

(1) With the cascaded configuration of GPS/IMU integration, the position and velocity output from the GPS Kalman filter residing in the GPS receiver is provided as a measurement input of the IKF. The measurement errors must be uncorrelated between observation epochs to meet the statistical conditions required by the IKF. Unfortunately, this requirement cannot be satisfied for the sequences of the filtered position and velocity outputs of the GPS receiver.

(2) A GPS positioning solution (position, velocity, and time) contains a certain amount of errors due to the GPS satellite segment. These errors are unobservable by the GPS Kalman filter of the GPS receiver and cannot be estimated. They change levels when the GPS satellite constellation in view change occurs, at which point they introduce undesirable IKF response transients.

(3) In most cases, because the GPS velocities provided by the GPS receiver are of very high accuracy, of about 0.2–0.4 m/sec (1$\sigma$), the GPS velocity update of the GPS/IMU integration results in the high observability of INS velocity errors, INS heading error, and inertial sensor errors, and can provide the INS with an in-flight startup operation. But in certain cases, transients of the order of a few meters per second dominate the GPS velocity without any other indication.

(4) Insufficient capability of detection and isolation of other GPS failures.

To overcome the first problem of the correlated measurement errors into the IKF, the position and velocity update interval applied to the IKF should be larger than their time constants respectively, so that they can be assumed to be uncorrelated in time. The time constant of the GPS position is much larger than that of the GPS velocity, because of the fast response of the GPS filters to the GPS range rate measurements. Thus, there is no constraint on the more accurate velocity update interval. The different requirement for the position and velocity update intervals brings about the inconvenience of implementation of the IKF.

One way of mitigating the second problem is to increase the measurement noise, so as to reduce the sensitivity to those errors. Another way of handling the above second problem is to employ the Schmidt-Kalman filter, in which the GPS errors due to the GPS space segment are considered but are not estimated.

As for the third problem, one approach is to formulate the measurement noise statistics dynamically, based on data collected between the filter update epochs (over a moving window). An alternative way to avoid the above third problem is to employ only GPS position information.

These conventional methods are used at the cost of reducing the accuracy of the integration solution, and have inadequacies in rapid GPS fault detection, isolation, and recovery (FDIR) performance.

The present invention is to provide a new filtering mechanization for the cascaded GPS/IMU integration, wherein GPS position and velocity updates are treated with separate filters, separate update rate, and multi-level filtering and consistent test.

Referring to FIG. 1, an INS filter 3 of the present invention, which is used to replace the conventional the IKF, comprises a first local filter device 31, a second local filter device 32, and a master filter device 33. The INS filter 3 is committed to provide optimal estimates of INS parameter errors, inertial sensor errors, and GPS correlated position and velocity error estimates to feed back to an INS unit 1 to reset the navigation equation and compensate the output of an IMU 11 contained in the INS unit 1, or to feed forward to compensate the INS position, velocity, and attitude data. A state vector of the first local filter device 31 is denoted as a first local state vector. A state vector of the second local filter device 32 is denoted as a second local state vector. A state vector of the master filter 33 is denoted as a global state vector.

Referring to FIG. 1, based on the above described configuration, a filtering mechanization method of integrating a GPS receiver carried by a carrier with the IMU 11 carried by the carrier for producing mixed GPS/IMU positioning data of the carrier is illustrated, which comprises the steps of:

(1) receiving angular rate and acceleration measurements of the carrier from the IMU 11 to a navigation equations processor 12 to produce INS data which include position, velocity, and attitude data of said carrier;

(2) sending the INS data from the navigation equations processor 12 and GPS velocity data from a GPS receiver 2 into the first local filter device 31;

(3) producing a first local state vector estimate and first local error covariance matrix by the first local filter device 31;

(4) sending GPS position data from the GPS receiver 2 and the INS data from the navigation equations processor 12 into the second local filter device 32;

(5) producing a second local state vector estimate and second local error covariance matrix by the second local filter device 32;

(6) receiving the first local state vector estimate and first local error covariance matrix from the first local filter device 31 and the second local state vector estimate and second local error covariance matrix from the second local filter device 32 by a master filter 33, so as to mix the first local state vector estimate and second local state vector estimate to form optimal estimates of a global state vector and a global error covariance matrix, including INS parameter errors, inertial sensor errors, and GPS correlated position and velocity error estimates, as output of the INS filter 3; and (7) compensating the INS position, velocity, and attitude data output of the navigation equations processor 12 using the optimal estimates of the INS parameter errors of the global state vector by an error remover 4 to form the mixed GPS/IMU position, velocity, and attitude data output.

In order to ensure that the linear INS parameter error model of the first local filter device 31, the second local filter device 32, and the master filter device 33 accurately represents the real characteristics of the output data error of the INS unit 1, the above step (7) can be replaced with the steps of:

(7A.1) feeding back the optimal estimates of the global state vector to the navigation equations processor 12;

(7A.2) compensating the IMU output with the optimal estimates of the inertial sensor errors from the optimal estimates of the global state vector to improve the accuracy of the output of the IMU 11 in real-time by the navigation equation processor 12;

(7A.3) resetting the INS position, velocity, and attitude values used in the navigation equations by the navigation equation processor 12 by means of compensating the current epoch INS position, velocity, and attitude data with the optimal estimates of the INS parameter errors from the optimal estimates of the global state vector, so that the INS computation at the next epoch can be based on the reset INS position, velocity, and attitude values; and (7A.4) outputting the current compensated INS position, velocity, and attitude data by the navigation equations processor 12 as the mixed GPS/IMU position, velocity, and attitude data output.

Figure 2:
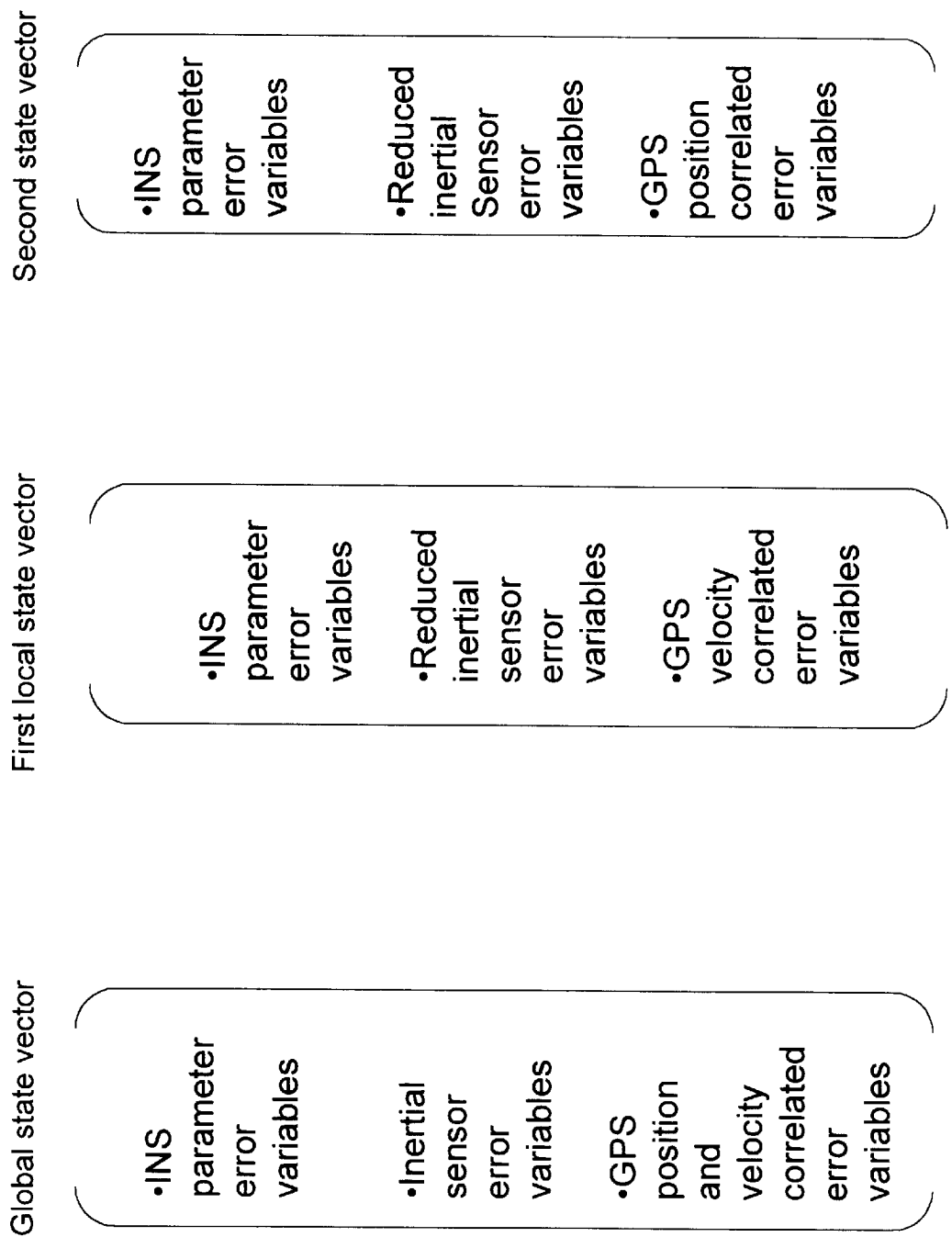
FIG. 2 is a block diagram illustrating the state variables of the global state vector, first local state vector, and the second state vector according to the above preferred embodiment of the present invention.

Referred to FIG. 2, the preferred global filter vector uses a high-order error model, including the INS parameter errors, inertial sensor errors, and GPS correlated position and velocity errors. The INS errors comprise three position errors, three velocity errors, and three attitude errors, which form a linear INS error model. The inertial sensor errors refer to measurement errors of the angular rate sensor and acceleration sensors of the IMU 11. The number of the inertial sensor errors is based on the dimension of the inertial error models. In a preferred configuration, the global state vector uses the high-order IMU error model and local filters use the reduced-order IMU error model, because the master filter can operate at reduced update rate. The number of the GPS correlated position and velocity errors is based on the dimension of the GPS correlated position and velocity error model. In a preferred configuration, the global state vector uses the high-order GPS correlated position and velocity error model and local filters use the reduced-order GPS correlated position and velocity error model, because the master filter can operate at reduced update rate.

The common state vector variables between the local filters and master filter are the INS parameter errors. However, if the local filters and master filter use the same IMU error model, the common state vector variables should include the inertial sensor errors.

The update intervals of the state vector estimate of the first local filter, second local filter, and master filter can be the same or different. The preferred update intervals of the first local filter, second local filter, and master filter are configured as follows:

(a) The first local filter device 31 can use the shortest update interval, such as one second.

(b) The second local filter device 32 can use the middle update interval, such as 25 seconds. The update interval of the second local filter should be more than the time constant of the GPS position to meet the requirement of the measurements of the second local filter device 32.

(c) The master filter employs the same as the update interval of the first local filter device 31 or second local filter device 32, or other alternatives.

Referring to FIG. 1, the optimal estimates of the global state vector and global error covariance matrix can be fed back to the first and second local filter devices 31, 32 to update the common state variable estimates to improve system performance. Therefore, after the step (7), the present invention further comprises the additional steps of:

(7B.1) feeding back the optimal estimates of the global state vector and global error covariance matrix to update the common state variable estimates of the first local filter device 31; and (7B.2) feeding back the optimal estimates of the global state vector and global error covariance matrix to update the common state variable estimates of the second local filter device 32.

Because the IMU 11 is a self-contained device, which implies that the output generation of the IMU 11 doesn't rely on any external signals at all. So, the reliability of the IMU is far better than that of GPS receivers. As availability of low cost, miniaturized MEMS (MicroElectroMechanical Systems) inertial sensors increase, the redundant IMU, in which more than three angular rate sensors and acceleration sensors are mounted in skew, has high degree of reliability. Therefore, it becomes critical to detect and isolate any GPS deterioration and failure for system reliability.

Figure 3:
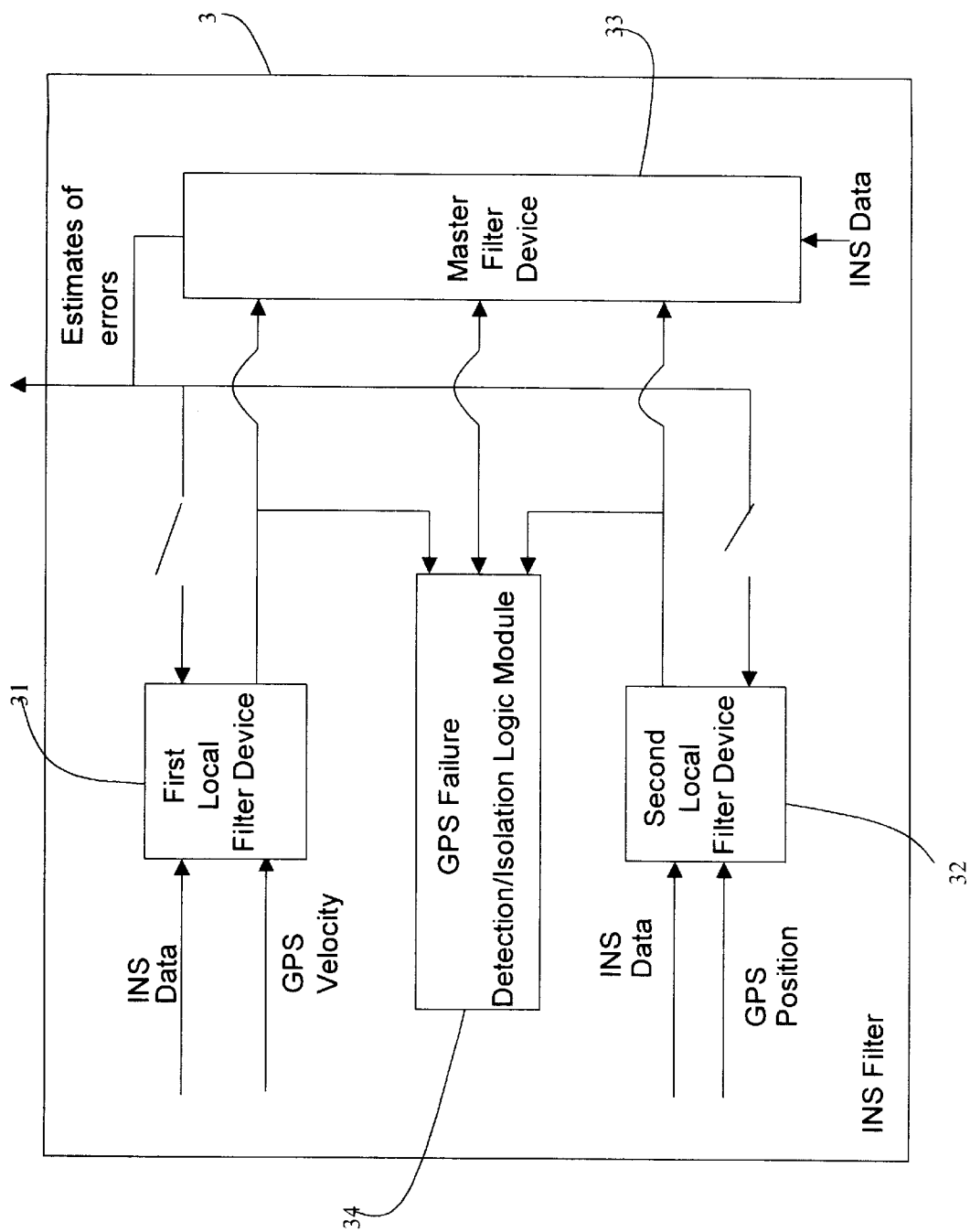
FIG. 3 is a block diagram illustrating the GPS failure detection/isolation logic module with relationship of the local filter devices and master filter devices according to the above preferred embodiment of the present invention.

Referring to FIG. 3, in order to achieve high degree of reliability of the mixed GPS/IMU positioning solution, the INS filer 3 further comprises a GPS failure detection/ isolation logic module 34 to detect a GPS solution's undesired transient, big velocity jump, and other unpredicted failures. Accordingly, the step (6) further comprises the following steps: (6A.1) receiving the first local state vector estimate and the first local error covariance matrix at a current epoch from the first local filter device 31, the second local state vector estimate and second error covariance matrix at the current epoch from the second local filter device 32, and a predicted estimate of the global state vector and global error covariance matrix at the current epoch from the master filter 33 by the GPS failure detection/isolation logic module 34;

(6A.2) testing consistency between the first local state vector estimate and first error covariance matrix and the predicted estimate of the global state vector and global error covariance matrix at the current epoch to determine whether the first local state vector estimate is GPS failure-free;

(6A.3) testing consistency between the second local state vector estimate and second error covariance matrix and the predicted estimate of the global state vector and global error covariance matrix at the current epoch to determine whether the second local state vector estimate is GPS failure-free; and (6A.4) updating the predicted estimate of the global state vector and global error covariance matrix at the current epoch by means of one of the following four steps:

(6A.4A) mixing the first local state vector estimate and first error covariance matrix from the first local filter device 31 and the second state vector estimate and second error covariance matrix from the second local filter device 32 to update the selected predicted estimate of the global state vector and global error covariance at the current epoch to form the optimal estimates of the global state vector and global error covariance, including INS parameter errors, inertial sensor errors, and GPS correlated position and velocity error estimates, as output of the INS filter 3 when both the first and second local state vectors are GPS failure-free;

(6A.4B) using the first local state vector estimate and first error covariance matrix to update the predicted estimate of the global state vector and global error covariance matrix at the current epoch to form optimal estimates of the global state vector and global error covariance matrix, including INS parameter errors, inertial sensor errors, and GPS correlated position and velocity error estimates, as output of the INS filter 3, when the second local state vector estimate is GPS failure-contaminated, and re-initializing the second local filter device 32;

(6A.4C) using the second local state vector estimate and second error covariance matrix to update the predicted estimate of the global state vector and global error covariance at the current epoch to form the optimal estimates of the global state vector and global error covariance matrix, including INS parameter errors, inertial sensor errors, and GPS correlated position and velocity error estimates, as output of the INS filter 3, when the first local state vector estimate is GPS failure-contaminated, and re-initializing the first local filter device 31; or (6A.4D) using the predicted estimate of the global state vector and global error covariance at the current epoch as the optimal estimates of the global state vector, including INS parameter errors, inertial sensor errors, and GPS correlated position and velocity error estimates, served as output of the INS filter 3, when both the first and second local state vector estimates are GPS failure-contaminated, and re-initializing both the first and second local filter device 31, 32.

Figure 4:
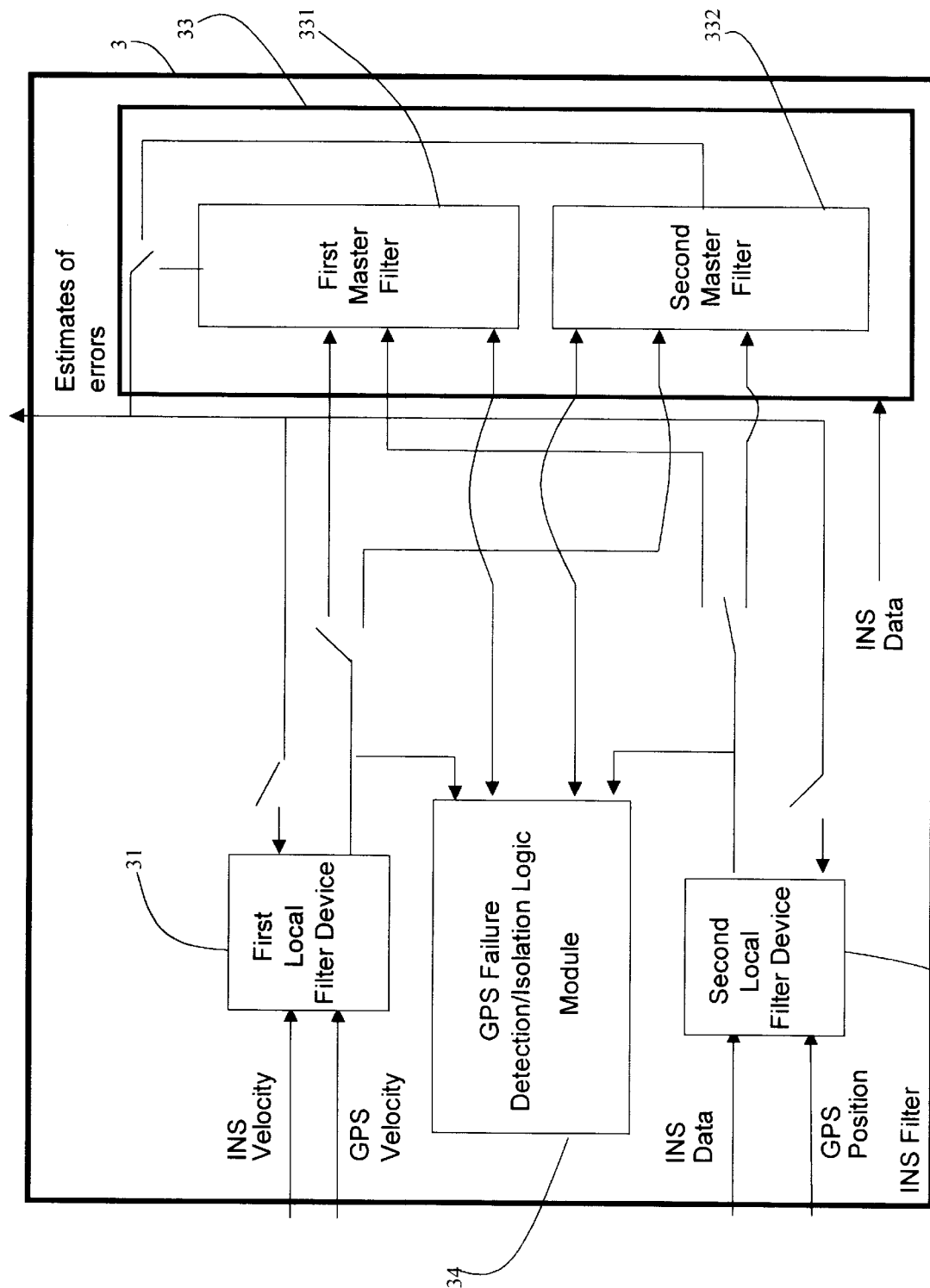
FIG. 4 is a block diagram illustrating the GPS failure detection/isolation logic module with relationship of the local filter devices and the master filter devices according to the above preferred embodiment of the present invention.

Referring to FIG. 4, in order to further improve reliability of the system, the master filter device 33 further comprise a bank of master filters to reduce the probability of misdetecting GPS failures. Assuming the mixing interval of the two local state vectors is $T_M$ and the bank of master filters contains $N_M$ member master filters. At every current epoch, only one master filter is updated and the other master filters are just time-propagated with their dynamic equations. Therefore, we can get predicted N sets of the global state vectors, which are time-propagated from $T_M, 2T_M, 3T_M, \ldots N_M T_M$ time points to the current time point. At the current epoch, the predicted N sets of the global state vectors can be tested with the two sets of local state vector estimates to determine whether any GPS failure is occurred. The preferred embodiment of the present invention also can determine when the GPS failure happened.

Referring to FIG. 5, the scenario of the master filer device 33 using a pair of master filters, the first master filter 331 and the second master filter 332 are disclosed as follows. The first and second master filters 331, 332 alternatively mix the first and second local state vector estimates from one epoch to another epoch.

Referring to FIGS. 4 and 5, the advantage of a pair of first and second master filters 331, 332 used for enhancing GPS failure detection/isolation is that we can get a predicted set of global state vectors at each epoch of mixing the two local state vector estimates, which is propagated independently without GPS information for two mixture intervals of the two sets of the local state vector estimates to facilitate detection of GPS soft failures. Meanwhile we can mix the two sets of the local state vector estimates in a short interval to form the optimal estimates of the global state vector. The GPS soft failure means that the GPS failure is slowly accumulated, which are very tough to detect traditionally.

Accordingly, the step 6 further comprises the steps of:

(6B.1) receiving the first local state vector estimate and the first local error covariance matrix at the current epoch from the first local filter device 31, and the second local state vector estimate and second error covariance matrix at the current epoch from the second local filter device 32 by the GPS failure detection/isolation logic module 34;

(6B.2) receiving the selected predicted estimate of the global state vector and global error covariance matrix from a selected master filter, which may be the first predicted estimate of the global state vector and global error covariance matrix from the first master filter 331 if the first master filter 331 is scheduled to be updated at the current epoch, or the second predicted estimate of the global state vector and global error covariance matrix from the second master filter 332 if the first master filter 332 is scheduled to be updated at the current epoch, by the GPS failure detection/isolation logic module 34;

(6B.3) testing consistency between the first local state vector estimate and first error covariance matrix and the selected predicted estimate of the global state vector and global error covariance matrix at the current epoch to determine whether the first local state vector estimate is GPS failure-free;

(6B.4) testing consistency between the second local state vector estimate and second error covariance matrix and the selected predicted estimate of the global state vector and global error covariance matrix at the current epoch to determine whether the second local state vector estimate is GPS failure-free; and (6B.5) updating the selected predicted estimate of the global state vector and global error covariance matrix at the current epoch by means of one of the following four steps:

(6B.5A) mixing the first local state vector estimate and first error covariance matrix from the first local filter device 31 and the second state vector estimate and second error covariance matrix from the second local filter device 32 to update the selected predicted estimate of the global state vector and global error covariance matrix at the current epoch to form the optimal estimates of the global state vector and global error covariance matrix, including INS parameter errors, inertial sensor errors, and GPS correlated position and velocity error estimates, as output of the INS filter 3 when both the first and second local state vectors are GPS failure-free;

(6B.5B) using the first local state vector estimate and first error covariance matrix to update the selected predicted estimate of the global state vector and global error covariance matrix at the current epoch to form the optimal estimates of the global state vector and global error covariance matrix, including INS parameter errors, inertial sensor errors, and GPS correlated position and velocity error estimates, as output of the INS filter 3, when the second local state vector estimate is GPS failure-contaminated, and re-initializing the second local filter device 32 and the other master filter;

(6B.5C) using the second local state vector estimate and second error covariance matrix to update the predicted estimate of the global state vector and global error covariance matrix at the current epoch to form the optimal estimates of the global state vector and global error covariance matrix, including INS parameter errors, inertial sensor errors, and GPS correlated position and velocity error estimates, as output of the INS filter 3, when the first local state vector estimate is GPS failure-contaminated, and re-initializing the first local filter device 31 and the other master filter; or (6B.5D) using the predicted estimate of the global state vector and global error covariance matrix at the current epoch as the optimal estimates of the global state vector and global error covariance matrix, including INS parameter errors, inertial sensor errors, and GPS correlated position and velocity error estimates, served as output of the INS filter 3, when both the first and second local state vector estimate are GPS failure-contaminated, and re-initializing both the first and second local filter device 31, 32 and the other master filter.

The preferred embodiment of the present invention is further disclosed as follows. The first local filter device corresponding to the GPS velocity update is taken as a local filter #1 (LF1). The second local filter device dedicated to the GPS position update is taken as local filter #2 (LF2), while a master filter (MF) fuses the estimates of the common state variables of the LF1 and LF2 local state vectors to obtain a optimal estimates of the global state vector. The information sharing principle is implemented only at the initialization of LF1 and LF2. In this configuration, the function of the conventional INS Kalman filter is provided by co-operation of the LF1, LF2, and MF.

The preferred first local state vector for LF1 is selected as $$X_{LF1} = X_{INS}$$

where, $X_{INS}$(15×1) includes: 3 INS velocity errors, 3 INS attitude errors, 3 INS position errors, 3 INS gyro drifts, 3 INS accelerometer biases. The measurement equation for LF1 is $$Z_{LF1} = H_{LF1} X_{LF1} + V_{LF1}$$

where, $$H_{LF1} = \begin{bmatrix} 1 & 0 & 0 \\ 0 & 1 & 0 & 0(3 \times 12) \\ 0 & 0 & 1 \end{bmatrix}$$

$V_{LF1}$ is the measurement white noise of the velocity output of the GPS receiver.

The second local state vector for LF2 is chosen as $$X_{LF2} = [X_{INS}, \delta\phi_{GPS}, \delta\lambda_{GPS}, \delta h_{GPS}]$$

where, the $\delta\phi_{GPS}$, $\delta\lambda_{GPS}$, and $\delta h_{GPS}$ are the correlated position errors of the position output of the GPS receiver output. The first order Gauss-Markov models are used to model their dynamics. Even though these correlated position errors are unobservable, augmenting LF2 with these errors can affect the covariance matrix of the other states and enhance the local filter robustness. The measurement equation for LF2 is $$Z_{LF2}=H_{LF2}X_{LF2}+V_{LF2}$$

where $$H = \begin{bmatrix} & 1 & 0 & 0 & \\ 0(3\times 6) & 0 & 1 & 0 & 0(3\times 12) \\ & 0 & 0 & 1 & \end{bmatrix}$$

$V_{LF2}$ is the measurement white noise of the position output of the GPS receiver. The standard Kalman filter prediction and update equations can be directly applied to LF1 and LF2. The optimal estimates of LF1 and LF2 local state vectors are referred to as $\hat{X}_{LF1K}$ and $\hat{X}_{LF2K}$, with the error covariance matrices $P_{LF1K}$ and $P_{LF2K}$, respectively. The dynamics of the system and measurement equations of LF1 and LF2 can be described as the following standard state and measurement equations $$X_k = \Phi_{k,k-1} X_{k-1} + W_{k-1}$$

$$Z_k = H_k X_k + V_K$$

where:

X: n-vector, state,
Z: m-vector, measurement
Φ: n×n matrix, state transition,
H: n×m matrix, measurement dynamics,
W: n×n matrix, system noise with covariance matrix, Q,
V: n×m matrix, measurement noise with covariance matrix, R,
k: time step.

The state estimation equations for LF1 and LF2 are:

$$\hat{X}_{k,k-1} = \Phi_{k,k-1} \hat{X}_{k-1}$$

$$P_{k,k-1} = \Phi_{k,k-1} P_{k-1} \Phi_{k,k-1}^T + Q_{k-1}$$

$$K_k = P_{k,k-1} H_K^T (H_k P_{k,k-1} H_k^T + R_k)^{-1}$$

$$\hat{X}_K = \hat{X}_{k,k-1} + K_k(Z_k - H_k \hat{X}_{k,k-1})$$

$$P_k = P_{k,k-1} K_k H_k P_{k,k-1}$$

where:

$\hat{X}_k$: n-vector, estimated state vector,
$P_k$: n×n matrix, covariance matrix,
$K_k$: n×m matrix, gain matrix.

According to the preferred embodiment of present invention, the system information is fully assigned to LF1 and LF2. The information sharing requirement is only performed initially, one time, by setting the initial values of the covariance matrix of the local state vectors and the covariance matrix of the process noise of LF1 and LF1 to 2 times the values they have in a traditional INS Kalman filter, as follows:

$$\hat{X}_{LF10} = \hat{X}_0$$

$$\hat{X}_{LF20} = \hat{X}_0$$

$$P_{LF10} = 2P_0$$

$$P_{LF20} = 2P_0$$

$$Q_{LF10} = 2P_0$$

$$Q_{LF20} = 2P_0$$

where, $\hat{X}_{LF10}$ and $\hat{X}_{LF20}$ are the initial local state estimates of LF1 and LF2 respectively. $P_{LF10}$ and $P_{LF20}$ are the error covariance matrices of the initial state estimate errors of LF1 and LF2, respectively. $Q_{LF10}$ and $Q_{LF20}$ are the covariance matrices of the process error of LF1 and LF2, respectively. $\hat{X}_0$, $P_0$, And $Q_0$ are the initial global state estimate, the initial covariance matrix of the global state vector, and initial covariance matrix of the system process error of the traditional INS Kalman filter.

When the optimal local state estimates and their error covariance matrix from LF1 and LF2 are passed to the MF, the MF produces the optimal global state estimates and the error covariance matrix. The equations for the optimal fusion for producing the global state vector using the optimal local state vector estimates from LF1 and LF2 in the MF are:

$$P_K = [P_{LF1K}^{-1} + P_{LF2K}^{-1}]^{-1}$$

$$\hat{X}_K = P_K [P_{LF1K}^{-1} \hat{X}_{LF1K} + P_{LF2K}^{-1} \hat{X}_{LF2K}]$$

In some applications, an alternative mode of the present invention can be embodied as follows:

(1C) Receiving angular rate and acceleration measurements of the carrier from the IMU 11 to a navigation equations processor 12 to produce INS data of the carrier, including position, velocity, and attitude data;

(2C) Sending INS data from the navigation equations processor 12 and GPS velocity data from a GPS receiver 2 into the first local filter device 31;

(3C) Producing the first local state vector estimate and first local error covariance matrix by the first local filter device 31;

(4C) Sending GPS position data of the GPS receiver 2 and INS data from the navigation equations processor 12 into the second local filter device 32;

(5C) Producing the second local state vector estimate and second local error covariance matrix by the second local filter device 32; and (6C) Compensating the INS position, velocity, and attitude data output of the navigation equations processor 12 using the first local state vector estimate and the second local state vector estimate by an error remover 4 to form the mixed GPS/IMU position, velocity, and attitude data output.

In order to ensure that the linear INS parameter error model used by the first local filter and second local filter accurately represents the real characteristics of the output data error of the INS unit 1, the above step (6C) can be replaced with the following steps:

(6C.1) feeding back the first local state vector estimate and the second local state vector estimate to the navigation equations processor 12; and (6C.2) compensating the IMU output with the optimal estimates of the inertial sensor errors from the first local state vector estimate and the second local state vector estimate to improve the accuracy of the output of the IMU 11 in real-time by the navigation equation processor 12;

(6C.3) resetting the INS position, velocity, and attitude values used in the navigation equations by the INS navigation equation processor 12 by means of compensating the current epoch INS position, velocity, and attitude data with the optimal estimates of the INS parameter errors from the first local state vector estimate and the second local state vector estimate, so that the INS computation at the next epoch can be based on the reset INS position, velocity, and attitude values;

(6C.4) outputting the current compensated INS position, velocity, and attitude data by the navigation equations processor 12 as the mixed GPS/IMU position, velocity, and attitude data output.

In some applications, another alternative mode of the present invention can be embodied as follows:

(1D) Receiving angular rate and acceleration measurements of the carrier from the IMU 11 to a navigation equations processor 12 to produce INS data of the carrier, including position, velocity, and attitude data;

(2D) Forming a bank of filters and switcher controller, including 1, 2, 3, . . . N member filter, starting from earliest, to constructing a filter sequences;

(3D) Sending INS data from the navigation equations processor 12 and GPS position and velocity data from a GPS receiver 2 into the switch controller in every T interval;

(3D) Updating one of the N member filter to obtain a candidate estimate of the state vector, including the INS parameter errors, inertial sensor errors, and GPS correlated position and velocity errors, and propagating the others (N–1) individual filter to obtain predicted (N–1) sets of state vector from T, 1T, 2T . . . NT time points to the current point, controlled by the switch controller;

(4D) Producing the current estimate of the state vector by means of comparing the candidate estimate of the state vector and predicted (N–1) sets of the state vector to determine if any GPS failure occurred;

(5D) Compensating the INS position, velocity, and attitude data output of the navigation equations processor 12 using the current estimate of the state vector by an error remover 4 to form the mixed GPS/IMU position, velocity, and attitude data output.

In order to ensure that the linear INS parameter error model used by the bank of filters accurately represents the real characteristics of the output data error of the INS unit 1, the above step 5D can be replaced with the following steps:

(5D.1) feeding the current estimate of the state vector to the navigation equations processor 12;

(5D.2) compensating the IMU output with the optimal estimates of the inertial sensor errors from the current estimate of the state vector to improve the accuracy of the output of the IMU 11 in real-time by the navigation equation processor 12;

(5D.3) resetting the INS position, velocity, and attitude values used in the navigation equations by the INS navigation equation processor 12 by means of compensating the current epoch INS position, velocity, and attitude data with the optimal estimates of the INS parameter errors from the current estimate of the state vector, so that the INS computation at the next epoch can be based on the reset INS position, velocity, and attitude values; and (5D.4) outputting the current compensated INS position, velocity, and attitude data by the navigation equation processor 12 as the mixed GPS/IMU position, velocity, and attitude data output.

The step (4D) further comprises one of the following steps:

(4D.1) outputting the candidate estimate of the state vector as the current estimate of the state vector whether any GPS failure is not detected at all; or (4D.2) outputting the predicted estimates of the state vector of the (i–1) individual filter as current estimate of the state vector, and re-initializing the (i)–(N) member filters, whether any GPS failure is detected when the candidate estimate of state vector is compared with the predicted estimates of the state vector of the (i) member filter.

What is claimed is:

1. A filtering mechanization method for integrating a global positioning system (GPS) receiver carried by a carrier with an inertial measurement unit (IMU) carried by said carrier for producing mixed global positioning system/inertial measurement unit (GPS/IMU) positioning data of said carrier, comprising the steps of:

(a) receiving angular rate and acceleration measurements of said carrier from said IMU to a navigation equations processor to produce inertial navigation system (INS) data, including position, velocity, and attitude data of said carrier;

(b) sending said INS data from said navigation equations processor and GPS velocity data from a global positioning system (GPS) receiver into said first local filter device;

(c) producing a first local state vector estimate and first local error covariance matrix by said first local filter device;

(d) sending GPS position data from said GPS receiver and said INS data from said navigation equations processor into said second local filter device;

(e) producing a second local state vector estimate and second local error covariance matrix by said second local filter device;

(f) receiving said first local state vector estimate and first local error covariance matrix from said first local filter device and said second local state vector estimate and second local error covariance matrix from said second local filter device by a master filter, so as to mix said first local state vector estimate and second local state vector estimate to form optimal estimates of a global state vector and global error covariance matrix, including inertial navigation system (INS) parameter errors, inertial sensor errors, and global positioning system (GPS) correlated position and velocity error estimates, as output of an inertial navigation system (INS) filter; and (g) compensating an INS position, velocity, and attitude data output of said navigation equations processor to produce a mixed global positioning system/inertial measurement unit (GPS/IMU) position, velocity, and attitude data output.

2. The filtering mechanization method, as recited in claim 1, wherein, in the step (g), said INS position, velocity, and attitude data output of said navigation equations processor is compensated by using said optimal estimates of said INS parameter errors of said global state vector by an error remover for producing said mixed GPS/IMU position, velocity, and attitude data output.

3. The filtering mechanization method, as recited in claim 2, after the step (g), further comprising the steps of:

(h.1) feeding back said optimal estimates of said global state vector and global error covariance matrix to update common state variable estimates of said first local filter device; and (h.2) feeding back said optimal estimates of said global state vector and global error covariance matrix to update common state variable estimates of said second local filter device.

4. The filtering mechanization method, as recited in claim 1, wherein the step (g) comprises the steps of:
(gA.1) feeding back said optimal estimates of said global state vector to said navigation equations processor;
(gA.2) compensating an inertial measurement unit (IMU) output with said optimal estimates of said inertial sensor errors from said optimal estimates of said global state vector to improve an accuracy of said IMU output in real-time by said navigation equation processor;
(gA.3) resetting said INS position, velocity, and attitude values used in said navigation equation processor by means of compensating current epoch inertial navigation system (INS) position, velocity, and attitude data with said optimal estimates of said INS parameter errors from said optimal estimates of said global state vector, wherein an inertial navigation system (INS) computation at a next epoch is based on reset INS position, velocity, and attitude values; and
(gA.4) outputting current compensated inertial navigation system (INS) position, velocity, and attitude data by said navigation equations processor as said mixed GPS/IMU position, velocity, and attitude data output.

5. The filtering mechanization method, as recited in claim 3, after the step (g), further comprising the steps of:
(h.1) feeding back said optimal estimates of said global state vector and global error covariance matrix to update common state variable estimates of said first local filter device; and
(h.2) feeding back said optimal estimates of said global state vector and global error covariance matrix to update common state variable estimates of said second local filter device.

6. The filtering mechanization method, as recited in claim 1, 2, 3, 4, or 5, wherein the step (f) further comprises the steps of:
(fA.1) receiving said first local state vector estimate and first local error covariance matrix at a current epoch from said first local filter device, said second local state vector estimate and second error covariance matrix at said current epoch from said second local filter device, and a predicted estimate of said global state vector and global error covariance matrix at said current epoch from said master filter by a global positioning system (GPS) failure detection/isolation logic module;
(fA.2) testing consistency between said first local state vector estimate and first error covariance matrix and said predicted estimate of said global state vector and global error covariance matrix at said current epoch to determine whether said first local state vector estimate is global positioning system (GPS) failure-free;
(fA.3) testing consistency between said second local state vector estimate and second error covariance matrix and said predicted estimate of said global state vector and global error covariance matrix at said current epoch to determine whether said second local state vector estimate is global positioning system (GPS) failure-free; and
(fA.4) updating said predicted estimate of said global state vector and global error covariance matrix at said current epoch.

7. The filtering mechanization method, as recited in claim 6, wherein the step (fA.4) comprises a step of mixing said first local state vector estimate and first error covariance matrix from said first local filter device and said second state vector estimate and second error covariance matrix from said second local filter device to update a selected predicted estimate of said global state vector and global error covariance at said current epoch to form said optimal estimates of said global state vector and global error covariance, including inertial navigation system (INS) parameter errors, inertial sensor errors, and global positioning system (GPS) correlated position and velocity error estimates, as output of said INS filter when both said first and second local state vectors are global positioning system (GPS) failure-free.

8. The filtering mechanization method, as recited in claim 6, wherein the step (fA.4) comprises a step of using said first local state vector estimate and first error covariance matrix to update said predicted estimate of said global state vector and global error covariance matrix at said current epoch to form said optimal estimates of said global state vector and global error covariance matrix, including inertial navigation system (INS) parameter errors, inertial sensor errors, and global positioning system (GPS) correlated position and velocity error estimates, as output of said INS filter, when said second local state vector estimate is global positioning system (GPS) failure-contaminated, and re-initializing said second local filter device.

9. The filtering mechanization method, as recited in claim 6, wherein the step (fA.4) comprises a step of using said second local state vector estimate and second error covariance matrix to update said predicted estimate of said global state vector and global error covariance at said current epoch to form said optimal estimates of said global state vector and global error covariance matrix, including inertial navigation system (INS) parameter errors, inertial sensor errors, and global positioning system (GPS) correlated position and velocity error estimates, as output of said INS filter, when said first local state vector estimate is global positioning system (GPS) failure-contaminated, and re-initializing said first local filter device.

10. The filtering mechanization method, as recited in claim 6, wherein the step (fA.4) comprises a step of using said predicted estimate of said global state vector and global error covariance at said current epoch as said optimal estimates of said global state vector, including inertial navigation system (INS) parameter errors, inertial sensor errors, and global positioning system (GPS) correlated position and velocity error estimates, served as output of said INS filter, when both said first and second local state vector estimates are global positioning system (GPS) failure-contaminated, and re-initializing both said first and second local filter device.

11. The filtering mechanization method, as recited in claim 1, 2, 3, 4, or 5, wherein said master filter device comprises a bank of master filters to reduce a probability of misdetecting global positioning system (GPS) failures, wherein a mixing interval of said first and second local state vectors is $T_M$ and said bank of master filters contains $N_M$ member master filters, so that at every current epoch, only one of said master filters is updated and said other master filters are time-propagated with dynamic equations thereof, therefore predicted N sets of said global state vectors are able to be achieved which are time-propagated from a predetermined number of time points to said current time point, wherein at said current epoch, said predicted N sets of said global state vectors are tested with said first and second local state vector estimates to determine whether a global positioning system (GPS) failure is occurred.

12. The filtering mechanization method, as recited in claim 1, 2, 3, 4, or 5, wherein said master filter device comprises two or more master filters to reduce a probability of misdetecting global positioning system (GPS) failures, and the step (f) further comprises the steps of:

(fB.1) receiving said first local state vector estimate and first local error covariance matrix at said current epoch from said first local filter device, and said second local state vector estimate and second error covariance matrix at said current epoch from said second local filter device by a global positioning system (GPS) failure detection/isolation logic module;

(fB.2) receiving a selected predicted estimate of said global state vector and global error covariance matrix from one of said master filters selected from said master filter device, when said selected master filter is scheduled to be updated at said current epoch, by said GPS failure detection/isolation logic module;

(fB.3) testing consistency between said first local state vector estimate and first error covariance matrix and said first predicted estimate of said global state vector and global error covariance matrix at said current epoch to determine whether said first local state vector estimate is global positioning system (GPS) failure-free;

(fB.4) testing consistency between said second local state vector estimate and second error covariance matrix and said second predicted estimate of said global state vector and global error covariance matrix at said current epoch to determine whether said second local state vector estimate is global positioning system (GPS) failure-free; and (fB.5) updating said selected predicted estimate of said global state vector and global error covariance matrix at said current epoch.

13. The filtering mechanization method, as recited in claim 12, wherein the step (fB.5) comprises a step of mixing said first local state vector estimate and first error covariance matrix from said first local filter device and said second state vector estimate and second error covariance matrix from said second local filter device to update said selected predicted estimate of said global state vector and global error covariance matrix at said current epoch to form said optimal estimates of said global state vector and global error covariance matrix, including inertial navigation system (INS) parameter errors, inertial sensor errors, and global positioning system (GPS) correlated position and velocity error estimates, as output of said INS filter when both said first and second local state vectors are global positioning system (GPS) failure-free.

14. The filtering mechanization method, as recited in claim 12, wherein the step (fB.5) comprises a step of using said first local state vector estimate and first error covariance matrix to update said selected predicted estimate of said global state vector and global error covariance matrix at said current epoch to form said optimal estimates of said global state vector and global error covariance matrix, including inertial navigation system (INS) parameter errors, inertial sensor errors, and global positioning system (GPS) correlated position and velocity error estimates, as output of said INS filter, when said second local state vector estimate is global positioning system (GPS) failure-contaminated, and re-initializing said second local filter device and said another master filter.

15. The filtering mechanization method, as recited in claim 12, wherein the step (fB.5) comprises a step of using said second local state vector estimate and second error covariance matrix to update said predicted estimate of said global state vector and global error covariance matrix at said current epoch to form said optimal estimates of said global state vector and global error covariance matrix, including inertial navigation system (INS) parameter errors, inertial sensor errors, and global positioning system (GPS) correlated position and velocity error estimates, as output of said INS filter, when said first local state vector estimate is global positioning system (GPS) failure-contaminated, and re-initializing said first local filter device and said another master filter.

16. The filtering mechanization method, as recited in claim 12, wherein the step (fB.5) comprises a step of using said predicted estimate of said global state vector and global error covariance matrix at said current epoch as said optimal estimates of said global state vector and global error covariance matrix, including inertial navigation system (INS) parameter errors, inertial sensor errors, and global positioning system (GPS) correlated position and velocity error estimates, served as output of said INS filter, when both said first and second local state vector estimate are global positioning system (GPS) failure-contaminated, and re-initializing both said first and second local filter device and said another master filter.

17. A filtering mechanization method for integrating a global positioning system (GPS) receiver carried by a carrier with an inertial measurement unit (IMU) carried by said carrier for producing mixed global positioning system/inertial measurement unit (GPS/IMU) positioning data of said carrier, comprising the steps of:

(a) receiving angular rate and acceleration measurements of said carrier from said IMU to a navigation equations processor to produce inertial navigation system (INS) data for said carrier, including position, velocity, and attitude data, (b) sending INS data from said navigation equations processor and global positioning system (GPS) velocity data from a global positioning system (GPS) receiver into a first local filter device;

(c) producing a first local state vector estimate and first local error covariance matrix by said first local filter device;

(d) sending global positioning system (GPS) position data of said GPS receiver and INS data from said navigation equations processor into a second local filter device;

(e) producing a second local state vector estimate and second local error covariance matrix by said second local filter device; and (f) compensating an INS position, velocity, and attitude data output of said navigation equations processor to produce a mixed global positioning system/inertial measurement unit (GPS/IMU) position, velocity, and attitude data output.

18. The filtering mechanization method, as recited in claim 17, wherein, in the step (f), said INS position, velocity, and attitude data output of said navigation equations processor is compensated by using said first local state vector estimate and said second local state vector estimate by an error remover to form said mixed GPS/IMU position, velocity, and attitude data output.

19. The filtering mechanization method, as recited in claim 17, wherein the step (f) comprises the steps of:

(f.1) feeding back said first local state vector estimate and said second local state vector estimate to said navigation equations processor; and (f.2) compensating an inertial measurement unit (IMU) output with said optimal estimates of said inertial sensor errors from said first local state vector estimate and said second local state vector estimate to improve an accuracy of said IMU output in real-time by said navigation equation processor;

(f.3) resetting said INS position, velocity, and attitude values used in said INS navigation equation processor by means of compensating current epoch inertial navigation system (INS) position, velocity, and attitude data with said optimal estimates of said INS parameter errors from said first local state vector estimate and said second local state vector estimate, wherein an inertial navigation system (INS) computation at a next epoch is based on reset inertial navigation system (INS) position velocity, and attitude values; and (f.4) outputting current compensated inertial navigation system (INS) position, velocity, and attitude data by said navigation equations processor as said mixed GPS/IMU position, velocity, and attitude data output.

20. A filtering mechanization method for integrating a global positioning system (GPS) receiver carried by a carrier with an inertial measurement unit (IMU) carried by said carrier for producing mixed global positioning system/inertial measurement unit (GPS/IMU) positioning data of said carrier, comprising the steps of:

(a) receiving angular rate and acceleration measurements of said carrier from said IMU to a navigation equations processor to produce inertial navigation system (INS) data of said carrier, including position, velocity, and attitude data;

(b) forming a bank of N member filters and a switcher controller;

(c) sending said INS data from said navigation equations processor and GPS position and velocity data from a global positioning system (GPS) receiver into said switch controller in every time interval;

(d) updating one of said member filters to obtain a candidate estimate of a state vector, including inertial navigation system (INS) parameter errors, inertial sensor errors, and global positioning system (GPS) correlated position and velocity errors, and propagating said other member filters to obtain predicted (N-1) sets of said state vector from N time points to a current point, controlled by said switch controller;

(e) producing a current estimate of said state vector by means of comparing said candidate estimate of said state vector and predicted (N-1) sets of said state vector to determine whether a global positioning system (GPS) failure is occurred; and (f) compensating an inertial navigation system (INS) position, velocity, and attitude data output of said navigation equations processor to produce a mixed GPS/IMU position, velocity, and attitude data output.

21. The filtering mechanization method, as recited in claim 20, wherein, in the step (f), said INS position, velocity, and attitude data output of said navigation equations processor is compensated by using said current estimate of said state vector by an error remover to form said mixed GPS/IMU position, velocity, and attitude data output.

22. The filtering mechanization method, as recited in claim 20, wherein the step (f) comprises the steps of:

(f.1) feeding said current estimate of said state vector to said navigation equations processor;

(f.2) compensating an inertial measurement unit (IMU) output with said optimal estimates of said inertial sensor errors from said current estimate of said state vector to improve an accuracy of said IMU output in real-time by said navigation equation processor;

(f.3) resetting inertial navigation system (INS) position, velocity, and attitude values used in said INS navigation equation processor by means of compensating current epoch inertial navigation system (INS) position, velocity, and attitude data with optimal estimates of INS parameter errors from a current estimate of said state vector, wherein an inertial navigation system (INS) computation at a next epoch is based on reset inertial navigation system (INS) position, velocity, and attitude values; and (f.4) outputting current compensated INS position, velocity, and attitude data said navigation equation processor as said mixed GPS/IMU position, velocity, and attitude data output.

23. The filtering mechanization method, as recited in claims 20, 21 or 22, wherein the step (d) further comprises a step of outputting said candidate estimate of said state vector as said current estimate of said state vector when there is no global positioning system (GPS) failure detected at all.

24. The filtering mechanization method, as recited in claims 20, 21 or 22, wherein the step (d) further comprises a step of outputting predicted estimates of said state vector of said member filters as current estimates of said state vector, and re-initializing said member filters, whether a global positioning system (GPS) failure is detected when said candidate estimate of state vector is compared with said predicted estimates of said state vector of said respective member filter.

* * * * *